United States Patent
Plath

(10) Patent No.: US 7,908,730 B2
(45) Date of Patent: Mar. 22, 2011

(54) PTC FITTING CARTRIDGE

(75) Inventor: Victor A. Plath, Nunica, MI (US)

(73) Assignee: Haldex Brake Corporation, Kansas City, MO (US)

( * ) Notice: Subject to any disclaimer, the term of this patent is extended or adjusted under 35 U.S.C. 154(b) by 827 days.

(21) Appl. No.: 11/484,448

(22) Filed: Jul. 11, 2006

(65) Prior Publication Data

US 2008/0012318 A1    Jan. 17, 2008

(51) Int. Cl.
    *B23P 11/02* (2006.01)
(52) U.S. Cl. ............................ 29/451; 285/330; 285/331
(58) Field of Classification Search .................. 285/307, 285/330, 331; 29/525, 450, 451
    See application file for complete search history.

(56) References Cited

U.S. PATENT DOCUMENTS

| | | | |
|---|---|---|---|
| 4,664,427 A * | 5/1987 | Johnston | 285/340 |
| 4,685,706 A * | 8/1987 | Kowal et al. | 285/322 |
| 5,429,394 A | 7/1995 | Olson | 285/23 |
| 5,636,662 A | 6/1997 | Olson | 138/89 |
| 5,711,550 A * | 1/1998 | Brandt | 285/101 |
| 6,224,117 B1 * | 5/2001 | Olson et al. | 285/322 |
| 6,938,651 B1 * | 9/2005 | Carter et al. | 141/67 |
| 2005/0121909 A1 | 6/2005 | Densel et al. | 285/322 |
| 2005/0258645 A1 | 11/2005 | Salomon-Bahls | |

FOREIGN PATENT DOCUMENTS

| | | |
|---|---|---|
| DE | 20214847 U1 | 3/2004 |
| DE | 20319959 U1 | 6/2005 |
| EP | 0733844 A2 | 9/1996 |
| EP | 1878962 A1 | 1/2008 |
| GB | 1436734 | 5/1976 |
| WO | 2006037967 A1 | 4/2006 |

OTHER PUBLICATIONS

Chinese Office Action, Chinese Patent Application No. 200710129111.2 received Feb. 11, 2009, 5 pages.
Extended European Search Report, Oct. 19, 2007, 10 pages.
Astralian Examiner's Report, Application No. 2007201899, Apr. 1, 2009, 3 pages.
Australian Examiner's Report No. 2; Application No. 2007201899; Jul. 28, 2009; 3 pages.
European Office Action; Application No. 07 110 041.6-2424; Apr. 7, 2009; 5 pages.

* cited by examiner

*Primary Examiner* — David P Bryant
*Assistant Examiner* — Christopher M Koehler
(74) *Attorney, Agent, or Firm* — St. Onge Steward Johnston & Reens LLC

(57) ABSTRACT

A Push To Connect (PTC) fitting cartridge for connecting to a pneumatic device, such as, an air brake or a height control valve, the PTC fitting cartridge including at least one protrusion positioned on an outer surface of the PTC fitting cartridge, which is provided to interact with an undercut positioned on an inner surface of a port. The undercut interacts with the protrusion to substantially eliminate stress on the surrounding material to reduce the chance of fraction thereof.

4 Claims, 2 Drawing Sheets

PTC FITTING CARTRIDGE

FIELD OF THE INVENTION

The invention relates to a Push To Connect (PTC) fitting cartridge used in a pneumatic device, and more specifically to a high strength plastic PTC cartridge attached to a housing of a pneumatic device, the system substantially eliminating stress on the housing due to the PTC cartridge.

BACKGROUND OF THE INVENTION

Pneumatic devices, such as, air brakes and height control valves, such as are used on heavy equipment, have been in use for many years. Pneumatic devices typically utilize a number of pneumatic lines, which must be connected and interconnected to the various devices. The pneumatic device typically comprises a housing to which a number of components may be connected. The housing is provided with a number of openings for receiving various connections and component connections.

Numerous types of connectors may be connected to the housing and may include, for example, threaded connectors, friction connectors and so forth. Push To Connect (PTC) fittings may also be used with various types of housing configurations. PTC fittings present a number of distinct advantages over other types of connectors. For instance, it is a relatively simple matter to connect pneumatic tubing with a PTC fitting as one simply needs to push the connector into a port, where the connector is retained by an interference fit.

Typically, PTC fittings are provided manufactured of a relatively hard plastic. The plastic is typically a highly engineered grade, having high strength characteristics. This means that the plastic material will have relatively little "give" as very high strength characteristics are advantageous for critical applications, such as, vehicle braking and vehicle ride height control.

The pneumatic device housing may also be provided with a highly engineered grade plastic port for receiving the plastic connector. In addition, various portions of the housing may comprise a highly engineered grade plastic with relatively high strength characteristics. Interference fit connectors, such as a PTC fitting, introduce stress to the surrounding material as the introduced stress between the connector and the port, maintains the connection.

However, a problem arises in particular with vehicle air brake and vehicle control valve applications, in part, due to the required relatively high strength characteristics of the PTC fitting. The press fit induces "hoop" stress in the port and subsequently the housing, which often results in fracturing in the surrounding material. Any fracturing of the surrounding material can result in loosening of the connection and/or catastrophic failure of the braking and/or height control system. Any failure of vehicle safety systems is unacceptable.

Therefore, what is desired is a PTC fitting manufactured of a highly engineered grade plastic having high strength characteristics for use in a vehicle air brake and/or height control system that substantially eliminates fracturing in the surrounding material due to introduced stress.

It is still further desired to provide highly reliable vehicle air brake and/or height control system that uses a PTC fitting manufactured of a highly engineered grade plastic having high strength characteristics that is received in a port of the pneumatic device.

SUMMARY OF THE INVENTION

These and other objectives are achieved in one advantageous embodiment, by the provision of a PTC fitting cartridge manufactured of a highly engineered grade plastic having high strength characteristics used in a vehicle air brake and/or height control system, which when advanced into a component, interconnects with an undercut provided in the surrounding material to substantially eliminate any "hoop" stress to avoid any fracturing of the surrounding material.

In this manner, rather that utilize the standard interference fitting, the PTC fitting cartridge of the present invention uses a snap fit for retention in the air brake housing or the height control valve housing. The highly engineered grade plastic PTC fitting cartridge will initially deflect radially inward upon advancement into the connector. The exterior of the PTC connector is provided with at least one protrusion that upon advancement of the protrusion past the undercut re-expands radially outward to interact with the undercut. In this manner, any "hoop" stress that may initially be experienced by the surrounding material upon advancement of the PTC fitting cartridge into the port, is only temporary because the PTC fitting cartridge is allowed to re-expand to its normal shape past the undercut.

As the protrusion(s) interacts with the undercut forming an interlock between the PTC fitting cartridge and the port, the PTC fitting cartridge is securely maintained or locked into the port. Therefore, the convenience of using a PTC fitting cartridge manufactured of a highly engineered grade plastic having high strength characteristics may be used in connection with a vehicle brake housing or a height control valve housing, while still not compromising the integrity of the pneumatic vehicle system.

It is contemplated that the PTC fitting cartridge may further be provided with means for removing the PTC fitting cartridge from the port. This may include, for example, means for disengaging the protrusion(s) from the undercut, such as deflection of the protrusion(s) radially inwardly so that the PTC fitting cartridge may be withdrawn from the port. For example, the PTC fitting cartridge may be provided with a shoulder on either side of the PTC fitting cartridge to which inward pressure may be applied to deflect the protrusion(s) inwardly. In this manner, the PTC fitting cartridge may then be unlocked from the port and then withdrawn from the housing.

In one advantageous embodiment, a pneumatic device assembly is provided, comprising a housing for the pneumatic device, where the housing has a port located therein. The pneumatic device assembly further comprises a push to connect fitting cartridge receivable in the port, where the push to connect fitting cartridge comprises plastic and includes at least one protrusion located on an outer surface thereof. The pneumatic device assembly is provided such that the port has an undercut located on an inner surface thereof for receiving the protrusion to create an interlock between the push to connect fitting cartridge and the housing, and the pneumatic device is selected from the group consisting of: a pneumatic brake and a pneumatic height control valve.

In another advantageous embodiment, a method for connecting a push to connect fitting cartridge to a pneumatic brake or a pneumatic height control valve is provided, comprising the steps of positioning a protrusion on an outer surface of a plastic push to connect fitting cartridge, and positioning a port in a housing of the pneumatic brake or a pneumatic height control valve for receiving the plastic push to connect fitting cartridge therein. The method further comprises the steps of forming an undercut in an inner surface of the port, inserting the plastic push to connect fitting cartridge into the port, and forming an interlock between the push to connect fitting cartridge and the port through the interaction of the protrusion with the undercut.

In still another advantageous embodiment, a pneumatic device assembly is provided, comprising a housing for the pneumatic device, where the housing having a port located therein, and the port has an inner surface with a cross section diameter of ($d_2$). The port also includes an undercut located on the inner surface, with the undercut having a cross section diameter of ($d_4$), where diameter ($d_2$) is smaller than diameter ($d_4$). The pneumatic device assembly further comprises a push to connect fitting cartridge receivable in the port, where the push to connect fitting cartridge comprises plastic and includes at least one protrusion located on an outer surface thereof. The pneumatic device assembly is provided such that the protrusion, upon advancement of the push to connect fitting cartridge into the port, interacts with the undercut to form an interlock, and the pneumatic device is selected from the group consisting of: a pneumatic brake and a pneumatic height control valve.

Other objects of the invention and its particular features and advantages will become more apparent from consideration of the following drawings and accompanying detailed description.

DETAILED DESCRIPTION OF THE INVENTION

Figure 1:
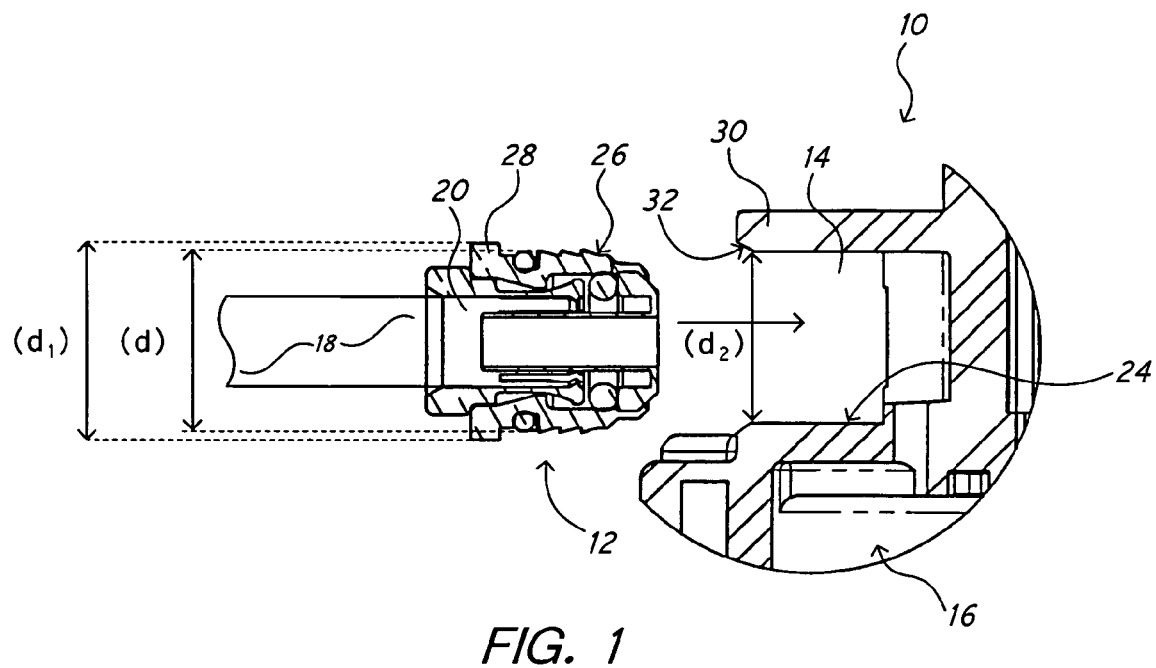
FIG. 1 is an illustration of a PTC cartridge to be inserted into a housing of a pneumatic device.

Referring now to the drawings, wherein like reference numerals designate corresponding structure throughout the views.

Figure 2:
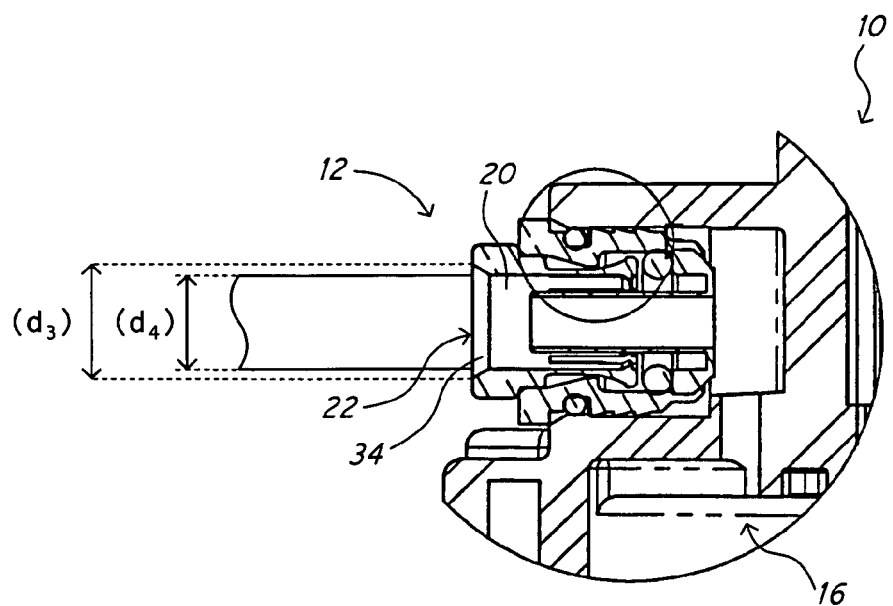
FIG. 2 is an illustration of the PTC cartridge according to FIG. 1 inserted into the housing of the pneumatic device.

FIGS. 1 and 2 illustrate a pneumatic device assembly 10, in which a Push To Connect (PTC) fitting cartridge 12 is illustrated. As seen in FIG. 1, PTC cartridge 12 is insertable into port 14 of pneumatic device 16, which may include, for example, a pneumatic brake and a pneumatic height control valve.

The PTC cartridge 12 is provided having a generally cylindrical diameter, but may, be provided with virtually any type of cross-section. PTC cartridge 12 is illustrated in FIG. 1 generally having a cross-section diameter (d).

PTC cartridge 12 is further illustrated in FIG. 1 having a cartridge shoulder 28, which is defined having a cross-section diameter ($d_1$). As can be seen in FIG. 1, cartridge shoulder 28 extends out beyond outer surface 26 of the PTC cartridge 12, such that, diameter ($d_1$) is larger than diameter (d).

PTC cartridge 12 is further illustrated having a tube 18 connection, which is illustrated in FIGS. 1 and 2. Tube 18 may couple to PTC cartridge 12 by means of a tube cavity 20, which extends from a distal end 22 of PTC cartridge 12. Tube cavity 20 is provided for receiving pneumatic tube 18 therein, the tube 18 coupled to the port 14 via the PTC cartridge 12. Tube 18 is provided such that, pressurized air may be selectively introduced and/or exhausted from the pneumatic device 16 via the tube 18.

Referring now to port 14 of pneumatic device 16, port 14 is provided having a generally cylindrical diameter and is provided with an inner surface 24 that is designed to receive outer surface 26 of the PTC cartridge 12 in relatively close fit. The inner surface 24 of port 14 is illustrated having a cross-section diameter ($d_2$).

In this manner, it is a relatively simple matter to insert PTC cartridge 12 into port 14 to couple tube 18 to pneumatic device 16 as is illustrated in FIG. 2.

Port 14 is further provided with a port shoulder 30, which is designed to abut cartridge shoulder 28 of PTC cartridge 12 as shown. As can be seen, port shoulder 30 is provided with a beveled section 32 to simplify the insertion of PTC cartridge 12.

Port shoulder 30 is provided such that, when PTC cartridge 12 is inserted therein, PTC cartridge 12 is steadied and securely maintained therein. Cartridge shoulder 28 is also provided as a stop for PTC cartridge 12 when cartridge shoulder 28 abuts up against port shoulder 30. As can be seen, the cross-section diameter ($d_1$) of cartridge shoulder 28 is larger than the cross-section diameter ($d_2$) of the inner surface 24 of port 14.

As seen in FIG. 2, tube 18 may be inserted in to tube cavity 20 via tube cavity opening 34. Tube cavity opening 34 is indicated as having an opening with a cross-section diameter ($d_3$), while tube cavity is shown having a cross-section diameter ($d_4$), where diameter ($d_3$) is larger than diameter ($d_4$). In this manner, tube 18 encounters a beveled edge at tube cavity opening 34 to facilitate insertion of tube 18 in cavity opening 34.

Figure 3:
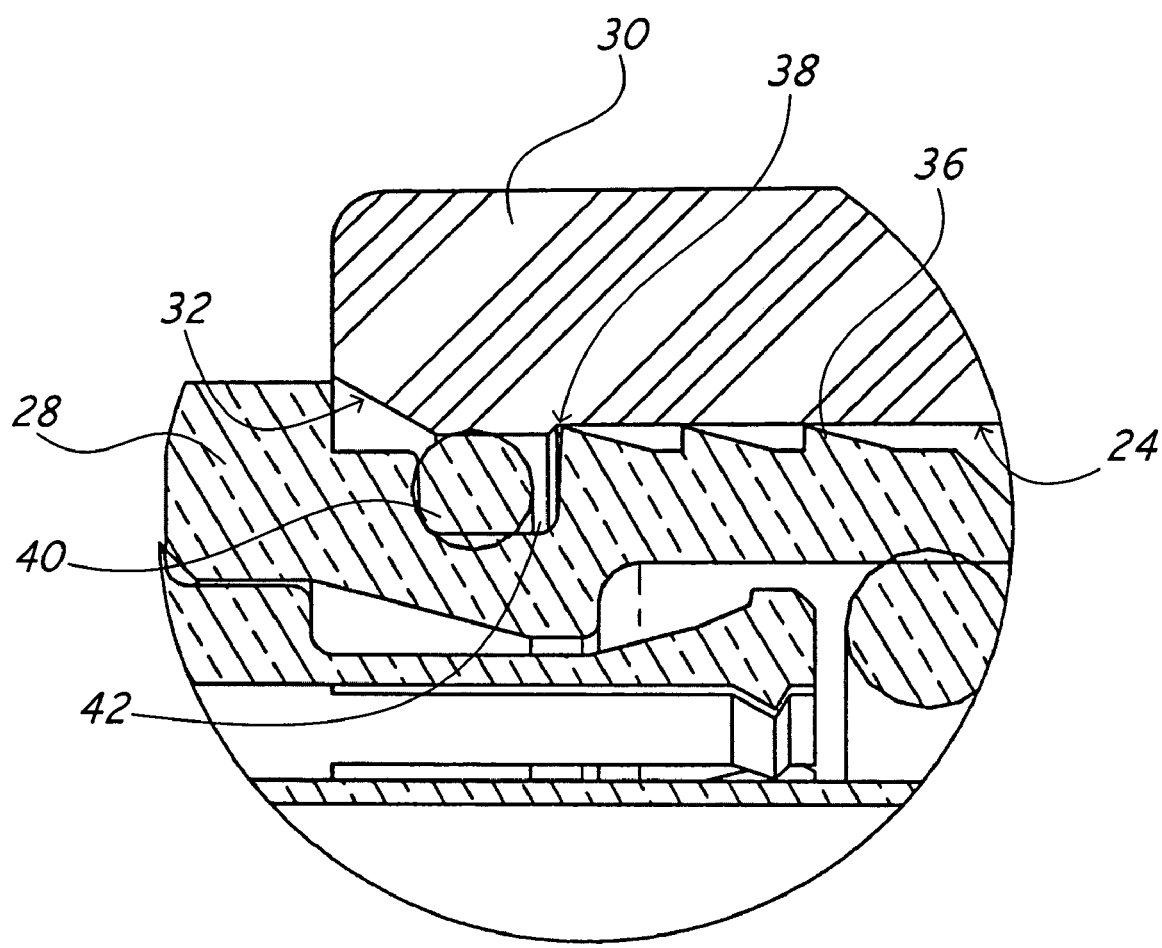
FIG. 3 is an enlarged view of the connection between the PTC connector and the component.

Referring now to FIG. 3, an enlarged view of a section of FIG. 2 is illustrated, which shows PTC cartridge 12 inserted in port 14, and more particularly, the interaction of PTC cartridge 12 with the inner surface 24 of port 14.

As shown in FIG. 3, outer surface 26 of the PTC cartridge 12 is provided with protrusion(s) 36, which in this embodiment are provided as teeth to engage with inner surface 24. Also illustrated in FIG. 3 is undercut 38, which is situated on inner surface 24 of port 14. Undercut 38 is provided to engage with protrusion(s) 36 such that, upon advancement of PTC cartridge 12 into port 14, a snap fit occurs and an interlock is developed. For example, the cross-section diameter (d) of PTC cartridge 12 is provided slightly larger than the cross-section diameter ($d_2$) of the inner surface 24. Therefore, advancement of PTC cartridge 12 into port 14 will generate "hoop" stress on the surrounding material as the protrusion(s) 36 are slightly deflected radially inward. However, as the protrusion(s) 36 advance past undercut 38, the protrusion(s) 36 is then able to expand radially outward again thereby reliving any "hoop" stress temporarily encountered by port 14.

It may also be seen from FIG. 3, that an O-ring 40 is provided in a channel 42, which is positioned between the inner surface 24 and the PCT cartridge 12. In this manner an air-tight seal may be created between PCT cartridge 12 and port 14. It is contemplated that O-ring 40 may comprise any type of material as desired for the application, but typically will comprise a pliable elastic material, such as, for example, rubber.

It can be seen from FIG. 3 that the interlock created between PCT cartridge 12 and port 14 creates a highly secure connection, which will not easily be interrupted. This is very advantageous as the coupling will not loosen or disconnect due to, for example, vibration.

It may however, become necessary to disconnect PTC cartridge 12 for servicing, replacement, etc. As an interlock has been created between PTC cartridge 12 and port 14, simply applying withdrawing pressure may not detach the PTC cartridge 12 from port 14. Accordingly, detaching means are provided in the form of cartridge shoulder 28, which may be deflected radially inward to as to disengage protrusion(s) 36 from undercut 38. In this manner, PTC cartridge 12 may then be easily withdrawn from port 14.

In this manner, a highly engineered grade plastic PTC fitting cartridge may effectively be used for connection of air tubes or conduits to an air brake or height control valve. Therefore, the present system allows for the speed and convenience of PTC fittings to be taken advantage of, while at the same time, any stress encountered by the surrounding material is substantially eliminated to avoid fracture of the surrounding material.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for connecting a push to connect fitting cartridge to a pneumatic brake or a pneumatic height control valve comprising the steps of:
    positioning a plurality of protrusions axially spaced apart on an outer surface of a plastic push to connect fitting cartridge;
    positioning a cartridge shoulder on the push to connect fitting cartridge, which abuts a port shoulder when said push to connect fitting cartridge is inserted into said port;
    positioning an O-ring in a channel on the outer surface of the push to connect fitting cartridge, the O-ring positioned adjacent one of said plurality of protrusions and axially spaced apart from the cartridge shoulder;
    positioning a port in a housing of the pneumatic brake or a pneumatic height control valve for receiving the plastic push to connect fitting cartridge therein, the port having an inner surface;
    forming an undercut in an inner surface of the port;
    axially advancing the plastic push to connect fitting cartridge into the port such that the plurality of protrusions advance past the undercut;
    wherein when the plastic push to connect fitting cartridge is fully inserted into the port, the O-ring does not pass the undercut so as to be maintained axially apart from the undercut; and
    forming an interlock between the push to connect fitting cartridge and the port through the interaction of the protrusion with the undercut and wherein the plurality of protrusions simultaneously contact the inner surface of the port when the plastic push to connect fitting cartridge is fully inserted into the port.

2. The method according to claim 1 wherein the plurality of protrusions comprise teeth.

3. The method according to claim 1 further comprising the steps of:
    deflecting the cartridge shoulder inwardly to disengage the protrusion from the undercut; and
    withdrawing the push to connect fitting cartridge from the port.

4. The method according to claim 1 further comprising the steps of:
    positioning a tube in a tube connection opening at a distal end of the push to connect fitting cartridge to couple the tube to the port; and
    selectively introducing and/or exhausting air from the pneumatic brake or a pneumatic height control valve via the tube.

* * * * *